(12) United States Patent
Chen

(10) Patent No.: US 7,405,539 B2
(45) Date of Patent: Jul. 29, 2008

(54) BATTERY CHARGER FOR PREVENTING CHARGING CURRENTS FROM OVERSHOOTING DURING MODE TRANSITION AND METHOD THEREOF

(75) Inventor: Pi-Fen Chen, Hsin-Chu (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 450 days.

(21) Appl. No.: 10/904,772

(22) Filed: Nov. 29, 2004

(65) Prior Publication Data

US 2006/0113966 A1    Jun. 1, 2006

(51) Int. Cl.
 H02J 7/04    (2006.01)
 H02J 7/06    (2006.01)
(52) U.S. Cl. .................................... 320/162; 320/163
(58) Field of Classification Search ............ 320/162
 See application file for complete search history.

(56) References Cited

U.S. PATENT DOCUMENTS

2005/0212489 A1*  9/2005  Denning et al. ............. 320/134

OTHER PUBLICATIONS

Microelectronic Circuits Fourth Edition by Sedra and Smith, Oxford University Press, 1998; pp. 862-863 and Fig. 10.34.*

* cited by examiner

Primary Examiner—Bao Q. Vu
Assistant Examiner—Richard V Muralidar
(74) Attorney, Agent, or Firm—Winston Hsu

(57) ABSTRACT

The present invention provides a battery charger and a method for preventing an overshoot charging current during a mode transition. The battery charger includes a charging regulation circuit for outputting a charging current whose amount is regulated based on a regulation signal at a control terminal, a first current sensing unit for sensing a current level and outputting an error signal based on both the current level and a first reference signal, an operational amplifier for generating the regulation signal, and a reference voltage generator which includes an ADC for converting the error signal outputted by the current sensing unit to a digital signal, and a DAC for converting the digital signal to a reference voltage.

6 Claims, 4 Drawing Sheets

BATTERY CHARGER FOR PREVENTING CHARGING CURRENTS FROM OVERSHOOTING DURING MODE TRANSITION AND METHOD THEREOF

BACKGROUND

The present invention relates to a battery charger, and more particularly, to a battery charger and related method for preventing the charging current from overshooting during the charging mode transition.

In a battery charging system for a lithium-ion (Li-ion) battery, a constant current (CC) mode is adopted to apply a high current to an exhausted battery to activate a rapid charging operation. When the battery is charged to a desired voltage level, the battery charging system switches to a constant voltage (CV) mode to maintain the battery at this desired voltage level. Since there exists an internal resistor in the battery, the battery is not fully-charged at the end of the CC mode. The voltage drop on the internal resistor makes the battery voltage be higher than it really is in the CC mode. After entering the CV mode, the battery voltage will be kept at the desired voltage level. In other words, the battery will be kept charging until the charging current becomes zero. When the charging current is zero, there is no voltage drop on the internal resistor and the battery is fully-charged to the desired voltage level.

The CC charging mode cannot be applied to the battery once the battery reaches the desired voltage level because the energy storage capacity of the battery would exceed the nominal rating, leading to AC adaptor, battery and charging system damage. However, the CC mode needs to be used during the first part of the charging operation in order to minimize overall charging time, i.e., the time for charging the battery with the CC mode must be maximized. Therefore, a proper transition between two charging modes is crucial to the battery charging system's performance.

Please refer to FIG. 1, which shows a related art battery charger 100. The related art battery charger 100 is used to charge a battery 150, and includes a charging regulation circuit 110, a comparator 120, a constant current (CC) mode controller 130, and a constant voltage (CV) mode controller 140, wherein the comparator 120 can be a hysteresis comparator for stabilizing the charging mode. As shown in FIG. 1, it is well-known that the battery 150 is equivalent to a series connection of a resistor $R_{int}$ and a capacitor $C_{int}$, and the charging regulation circuit 110 is connected to a power supplier (not shown). The comparator 120 is used to compare a battery voltage $V_{bat}$ of the battery 150 with a reference signal $V_{ref\_1}$ to check whether the battery voltage $V_{bat}$ is below a threshold. If the battery voltage $V_{bat}$ is lower than the reference signal $V_{ref\_1}$ the comparator 120 sends out a non-enabling signal D' to switch on switches SW1, SW3, and to switch off switches SW2, SW4, and then the battery 150 is charged in the CC mode.

In the CC mode the charging regulation circuit 110 is controlled to provide the battery 150 with a constant charging current. As shown in FIG. 1, the charging regulation circuit 110 is configured by a PMOS transistor 111 to regulate the required charging current. The CC mode controller 130 includes a sensor 135, which monitors the charging current flowing through a resistor R. After measuring the charging current flowing through the resistor R, the sensor 135 outputs a voltage V1, which corresponds to the voltage drop across the resistor R, into an operational amplifier 132. For example, if the detected voltage drop is 160 mV, the sensor 135 converts the voltage drop into a voltage level of 160 mV. The operational amplifier 132 sends out a regulation signal S1 to adjust the gate voltage of the PMOS 111 for regulating and stabilizing the charging current outputted from the power supplier, which is further explained as follows. Here, the charging regulation circuit 110, the resistor R, the sensor 135, and the operational amplifier 132 form a closed loop; the voltage V1 acts as a feedback signal. As shown in FIG. 1, the operational amplifier 132 determines the voltage level of the regulation signal S1 by comparing the incoming voltage V1 with a reference signal $V_{ref\_2}$. Assume the charging current during the CC mode is designed to be 10 mA, and the resistance of the resistor R is a known value 50Ω. It is clear that if the charging regulation circuit 110 successfully outputs the desired charging current 10 mA, the voltage drop cross the resistor R will be 500 mV. Therefore, the reference signal $V_{ref\_2}$ is set to 500 mV for checking whether the current flowing through the resistor R has the desired current value. If the voltage V1 is greater than the reference signal $V_{ref\_2}$, the regulation signal S1, which has a higher voltage level amplified by the operational amplifier 132, controls the charging regulation circuit 110 to reduce the charging current; however, if the voltage V1 is less than the reference signal $V_{ref\_2}$, the regulation signal S1, which has a lower voltage level amplified by the operational amplifier 132, controls the charging regulation circuit 110 to increase the charging current. As a result, the battery 150 receives a stable charging current.

The battery charger 100 turns into the CV mode from the CC mode when the battery voltage $V_{bat}$ is at a termination voltage level, that is, a reference voltage $V_{ref\_3}$. When the battery charger 100 is charging in the CC mode, the comparator 120 keeps comparing the battery voltage $V_{bat}$ with the reference voltage $V_{ref\_3}$. When the battery voltage $V_{bat}$ is not less than the reference voltage $V_{ref\_3}$ the comparator 120 sends out the enabling signal D to change the on/off states of the switches. Therefore, switches SW1, SW3 are switched off, and switches SW2, SW4 are switched on. As a result, the battery charger 100 enters the CV mode. In the CV mode, the comparator 120 keeps comparing the battery voltage $V_{bat}$ with the reference voltage $V_{ref\_1}$. When the battery voltage $V_{bat}$ is lower than the reference voltage $V_{ref\_1}$, the battery charger 100 returns to the CC mode.

In the CV mode the charging regulation circuit 110 charges the battery 150 to the termination voltage level and the battery charger 100 maintains the battery voltage $V_{bat}$ at the termination voltage level. In the CV mode, the CV mode controller 140 acts as a regulator to regulate the charging current. An operational amplifier 142 within the CV mode controller 140 compares the battery voltage $V_{bat}$ with a reference voltage $V_{ref\_3}$, and sends out a regulation signal S2 to control the gate voltage of the PMOS 111 for further tuning the charging current. Similar to the CC mode, the CV mode also forms a closed loop including the charging regulation circuit 110, the resistor R, and the operational amplifier 142. In order to stabilize the battery voltage $V_{bat}$ at the reference voltage $V_{ref\_3}$, the operational amplifier 142 compares the reference voltage $V_{ref\_3}$ with the battery voltage $V_{bat}$ to decide how to regulate the charging current. In other words, the gate voltage of the PMOS transistor 111 is precisely adjusted by the regulation signal S2 when the battery voltage $V_{bat}$ deviates from the reference voltage $V_{ref\_3}$. As a result, the battery 150 is steadily charged at the constant battery voltage $V_{bat}$.

The battery charger 100 will enter the CC mode again when the battery voltage $V_{bat}$ is lower than the reference voltage $V_{ref\_1}$, for example, fully-charged battery 150 is removed and a new exhausted battery is connected, which is explained as follows. During charging in the CV mode, the operational amplifier 142 controls the charging regulation circuit 110, while the comparator 120 keeps comparing the battery voltage $V_{bat}$ with the reference signal $V_{ref\_1}$, which is lower than the reference voltage $V_{ref\_3}$. When a fully-charged battery is taken away and an exhausted battery is connected to the battery charger 100, the battery voltage $V_{bat}$ becomes low. If the battery voltage $V_{bat}$ is lower than the reference signal $V_{ref\_1}$, the comparator 120 sends out a non-enabling signal D' to initialize the battery charger 100, setting it into the CC mode wherein switches SW1, SW3 are on and switches SW2, SW4 are off. Therefore, the battery charger 100 again provides the exhausted battery with a constant charging current.

As mentioned above, there are two modes, the CC mode and the CV mode, selectively used by the battery charger 100; hence there is a transition between these two modes. However, because the comparators 120 and the operational amplifier 142 are not perfectly matched due to well-known manufacturing variations, the transition between these two modes may not be very smooth, and this situation could cause an overshoot charging current to damage an AC adaptor, the battery charger 100 or the battery 150. For example, assume that the constant charging current during the CC mode is 800 mA, the reference signal $V_{ref\_1}$ is 4.1 V, and the reference voltage $V_{ref\_3}$ is 4.2V, which is the same as the termination voltage. Ideally, the transition occurs when the battery voltage $V_{bat}$ is equal to 4.2V, and then the CV mode closed loop is enabled to maintain the battery voltage $V_{bat}$ at 4.2V. As a result, the charging current would still be kept at 800 mA at the moment of entering the CV mode, and the transition between two modes would therefore be very smooth. However, practically, because the comparator 120 and the operational amplifier 142 are not matched in their characteristics, the voltage at which the transition occurs and the voltage at which the CV mode loop tries to maintain are likely to be different. That is, if the comparator 120 abnormally sends out an enabling signal D when $V_{bat}$ is still less than 4.2V, for example 4.1 V, and then the operational amplifier 142 will sends out a regulation signal S2 to maintain the battery voltage $V_{bat}$ at 4.2V by further increasing the charging current by controlling the PMOS 111. The charging current at the situation is larger than the current in the CC mode. Therefore, an overshoot charging current capable of damaging the AC adaptor, the battery charger 100 or the battery 150 is likely to be induced.

With this in mind, it is desirable to provide a battery charger which can minimize the overshoot charging current to prevent the AC adaptor, the battery charger and the battery from being damaged.

SUMMARY

One objective of the claimed invention is therefore to provide a battery charger for preventing an overshoot charging current to solve the above problem.

According to an embodiment of the present invention, a battery charger is disclosed. The battery charger includes: a charging regulation circuit which has an input terminal, a control terminal, and an output terminal, wherein the input terminal is for being coupled to a power supplier, the output terminal is coupled to a node N1, the control terminal is coupled to a node N5, and the charging regulation circuit outputs a charging current whose amount is regulated based on a regulation signal at the control terminal; a current sensing unit having a first and a second input terminals and a first and a second output terminals, wherein the first input terminal is coupled to the node N1, the first output terminal is coupled to a node N2 that is for being coupled to the battery, the second input terminal is inputted by a first reference signal, the second output terminal is coupled to a node N3, and the current sensing unit senses a current level on a path from the node N1 to the node N2 and outputs an error signal at the node N3 based on the current level and the first reference signal; an operational amplifier having a positive input terminal coupled to the node N2, a negative input terminal coupled to a node N4, and an output terminal coupled to the node N5 for generating the regulation signal; and a reference voltage generator having an input terminal coupled to the node N3 and an output terminal coupled to the node N4, including: an ADC for converting the error signal outputted by the current sensing unit to a digital signal; and a DAC for converting the digital signal to a reference voltage.

By adding a voltage generator to the related art battery charger, the overshoot charging current will be reduced and the mode transition will be smooth.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
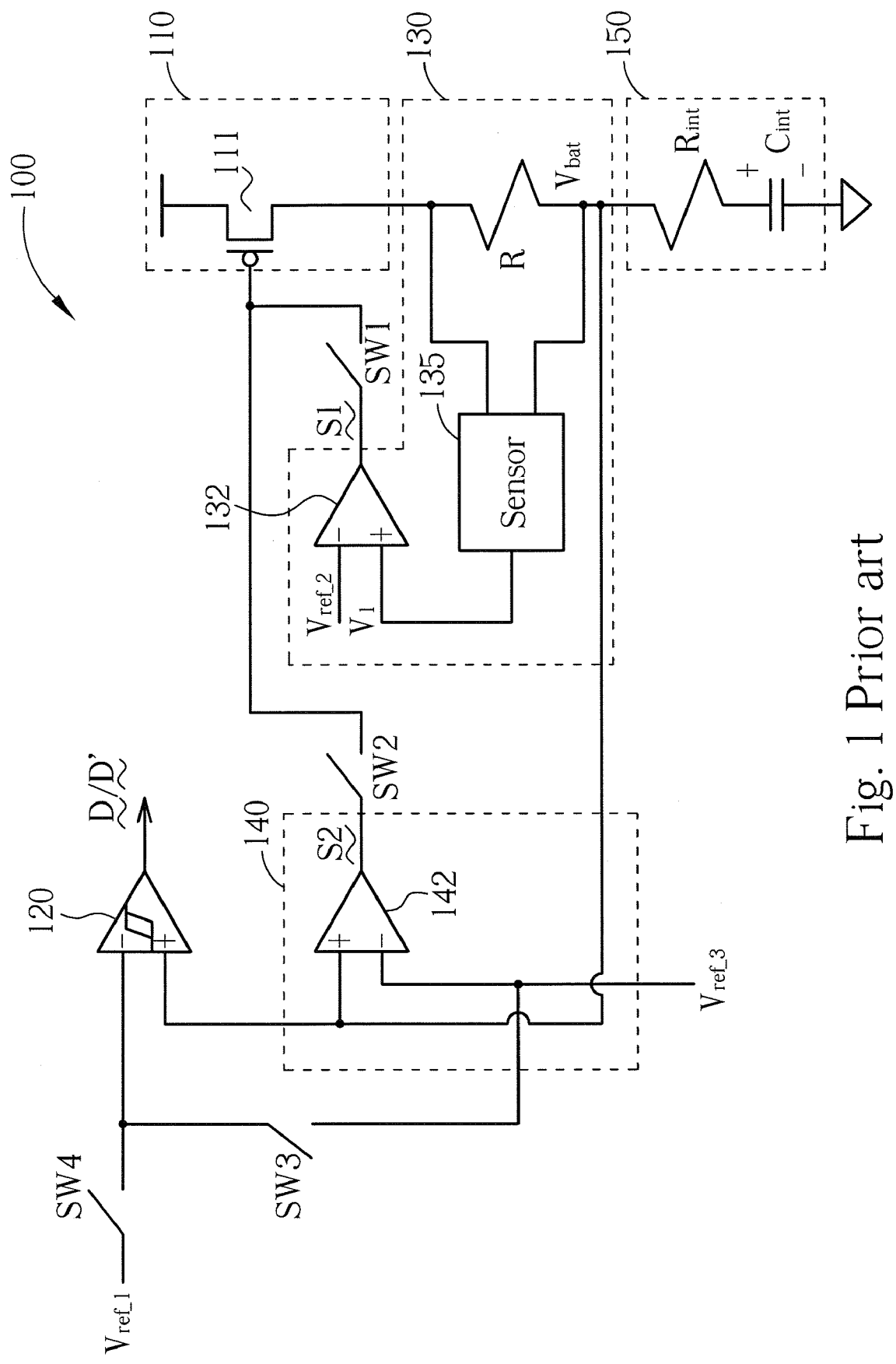
FIG. 1 is a diagram illustrating a battery charger according to the related art.
Figure 2:
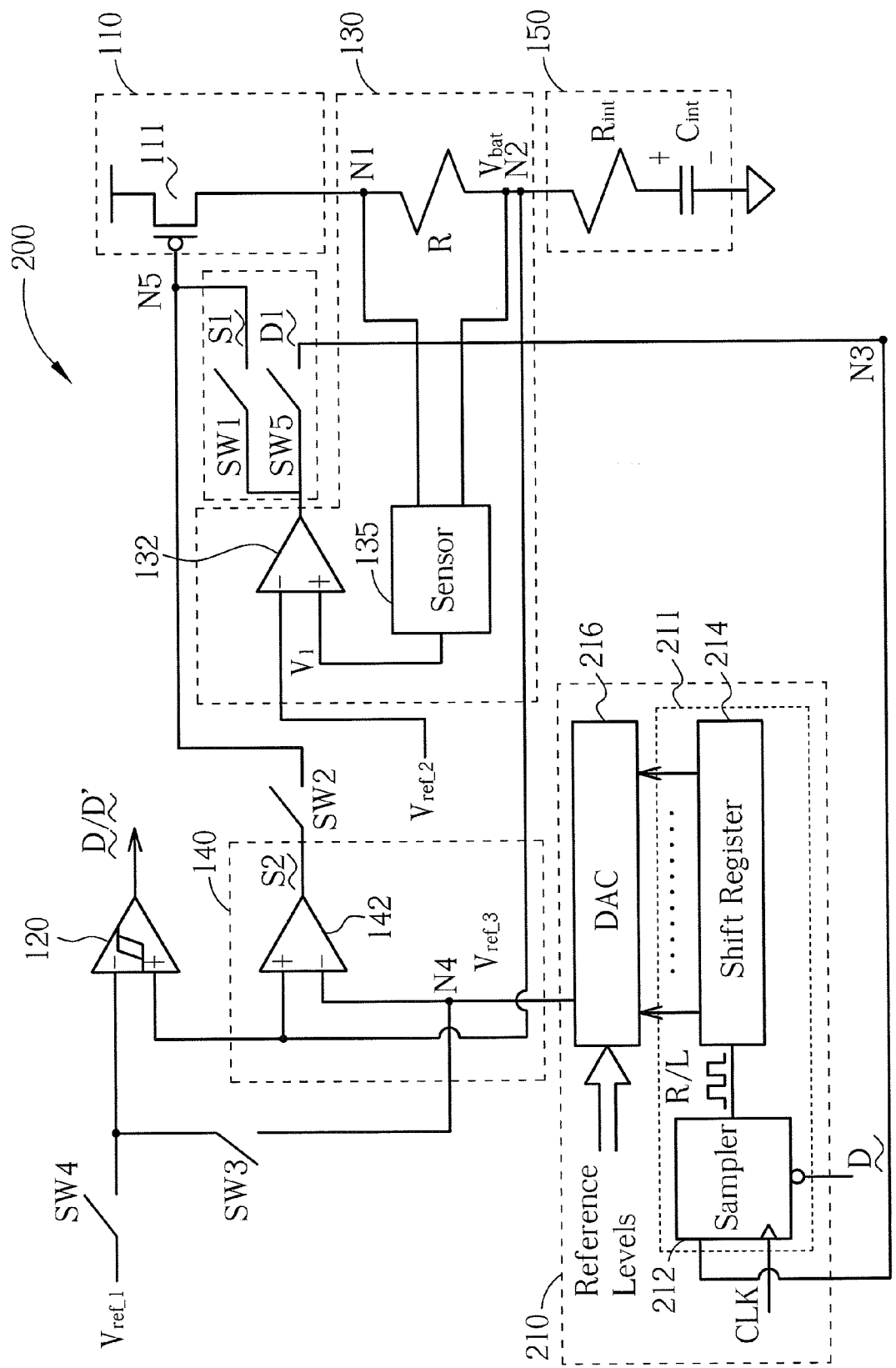
FIG. 2 is a diagram illustrating a battery charger according to an embodiment of the present invention.

In order to reduce the overshoot charging current, an adjusting mechanism can be applied to control the battery voltage $V_{bat}$. Please refer to FIG. 2, which shows a battery charger 200 according to the present invention. In this embodiment, the battery charger 200 includes the charging regulation circuit 110 formed by the PMOS transistor 111 the comparator 120, the CC mode controller 130, the CV mode controller 140, and a reference voltage generator 210 to charge a battery 150, wherein the comparator 120 can be a hysteresis comparator for stabilizing the charging mode. Compared with the related art battery charger 100 shown in FIG. 1, the battery charger 200 is very similar to the battery charger 100, and the only difference lies in that the battery charger 200 contains an extra reference voltage generator 210, which is electrically connected to the operational amplifier 142, to properly tune the reference voltage $V_{ref\_3}$. Further, the reference voltage generator 210, as shown in FIG. 2, is electrically connected to an output node of the operational amplifier 132 through a switch SW5, and is electrically connected to the comparator 120 through the switch SW3. Please note that the functionality and operation of each of the charging regulation circuit 110, the comparator 120, the CC mode controller 130, and the CV mode controller 140 has been described above, and the lengthy description is omitted for brevity.

When the battery charger 200 is in the CC mode, the switches SW1, SW3 are on and switches SW2, SW4, SW5 are off, and the comparator 120 compares the battery voltage $V_{bat}$ with the reference voltage $V_{ref\_3}$. In the CC mode, the reference voltage $V_{ref\_3}$ is set to a termination value controlled by the reference voltage generator 210. When the battery voltage $V_{bat}$ is not less than the reference voltage $V_{ref\_3}$, 4.2V for Li-ion battery for example, the comparator 120 sends out the enabling signal D to switch off SW1, SW3 and switch on SW2, SW4, SW5, and the battery charger 200 hence enters the CV mode. The operational amplifier 142 tries to maintain the battery voltage $V_{bat}$ at the reference voltage $V_{ref\_3}$, i.e., 4.2V, and meanwhile the operational amplifier 132 serves as a pure comparator since the switch SW1 is now off and the operational amplifier 132 is not included in the closed loop mentioned above. The operational amplifier 132 compares the voltage V1 with the reference signal $V_{ref\_2}$ to determine how to adjust the charging current, wherein the voltage V1 indicates a current level of the charging current flowing through the resistor R. For example, if the resistor R is 0.2Ω, and the constant charging current of the CC mode is 800 mA, the reference signal $V_{ref\_2}$ should be 160 mV, which is equal to 0.2Ω×800 mA. When the battery charger 200 transits form CC mode to CV mode, if the transient charging current is higher than 800 mA, the voltage V1 is greater than 160 mV. As a result, the comparator 132 sends an error signal D1 having a positive voltage level to the reference voltage generator 210. The error signal D1 is further received by an analog-to-digital converter (ADC) 211. In the present invention, the ADC 211 contains a sampler 212, which is activated by the enabling signal D and is triggered by an external clock signal CLK, for example, a 10 kHz clock, and a shift register 214. After the sampler 212 samples the error signal D1, the error signal D1 is converted from an analog signal to a digital shift signal R/L to right-shift/left-shift the bits stored in the shift register 214.

In the present invention the shift register 214 has 9 bits, where only one bit is set to "1" and other bits hold "0" for defining a control code (for example, "000000001", "000000010", . . . , or "100000000"). This type of control code is called a "1 of 9 code". Then, the stored control code is transferred to a digital-to-analog converter (DAC) 216.

Figure 3:
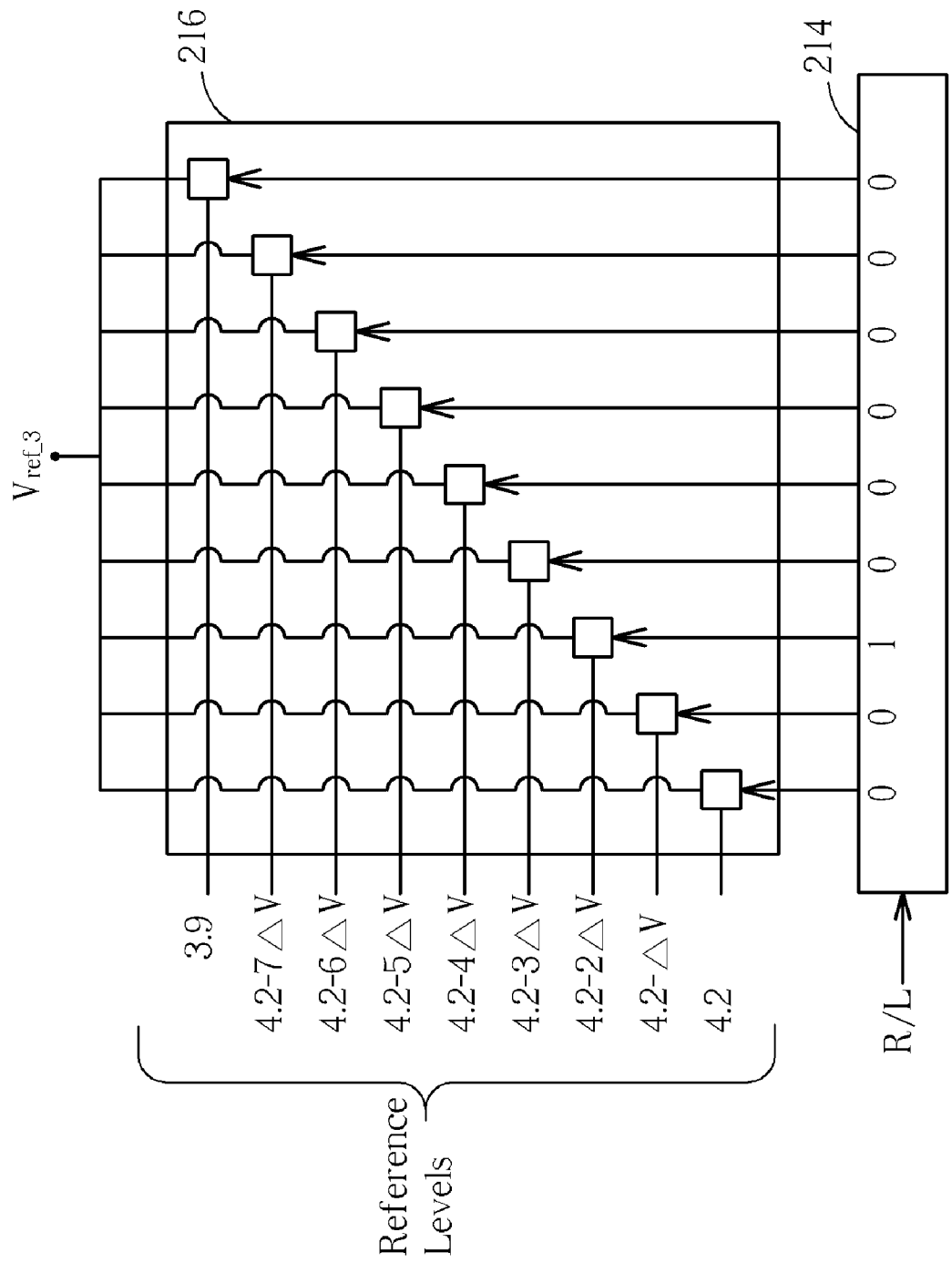
FIG. 3 is a circuit diagram of a Digital-to-Analog Converter (DAC) shown in FIG. 2.

The DAC 216 converts the received digital control code into the reference voltage $V_{ref\_3}$. In this embodiment, the DAC 216 can be simply implemented by a multiplexer (MUX). Please refer to FIG. 3, which shows the inner circuitry of the DAC 216. The DAC 216 has nine inputs corresponding to nine reference levels ranging equally from 3.9V to 4.2V. The control code outputted from the shift register 214 determines which of the 9 inputs is selected and then outputted to be the third voltage reference $V_{ref\_3}$. For example, as shown in FIG. 3, the control code is "001000000", so the reference voltage $V_{ref\_3}$ will be "4.2−2ΔV", where ΔV is equal to (4.2−3.9)/8.

Generally speaking, the control code is initialized with "100000000", so when the battery charger 200 works during the CC mode or in the beginning of the CV mode, the reference voltage $V_{ref\_3}$ is equal to 4.2V. During the CV mode, if the sampler 212 samples a high level from the incoming error signal D1, that is, if the current level of the charging current is higher than the desired 800 mA, the shift signal R/L right-shifts the bit "1" to form a new control word "010000000". At this time, the reference voltage $V_{ref\_3}$ is decreased by ΔV, so the battery voltage $V_{bat}$ is held at a lower voltage level and the charging current decreases accordingly. Moreover, if the sampler 212 later samples a low level from the incoming error signal D1, that is, if the current level of the charging current is lower than 800 mA, the shift signal R/L left-shifts the bit "1" bit, so the reference voltage $V_{ref\_3}$ is increased by ΔV, leading to an increase of the charging current.

Figure 4:
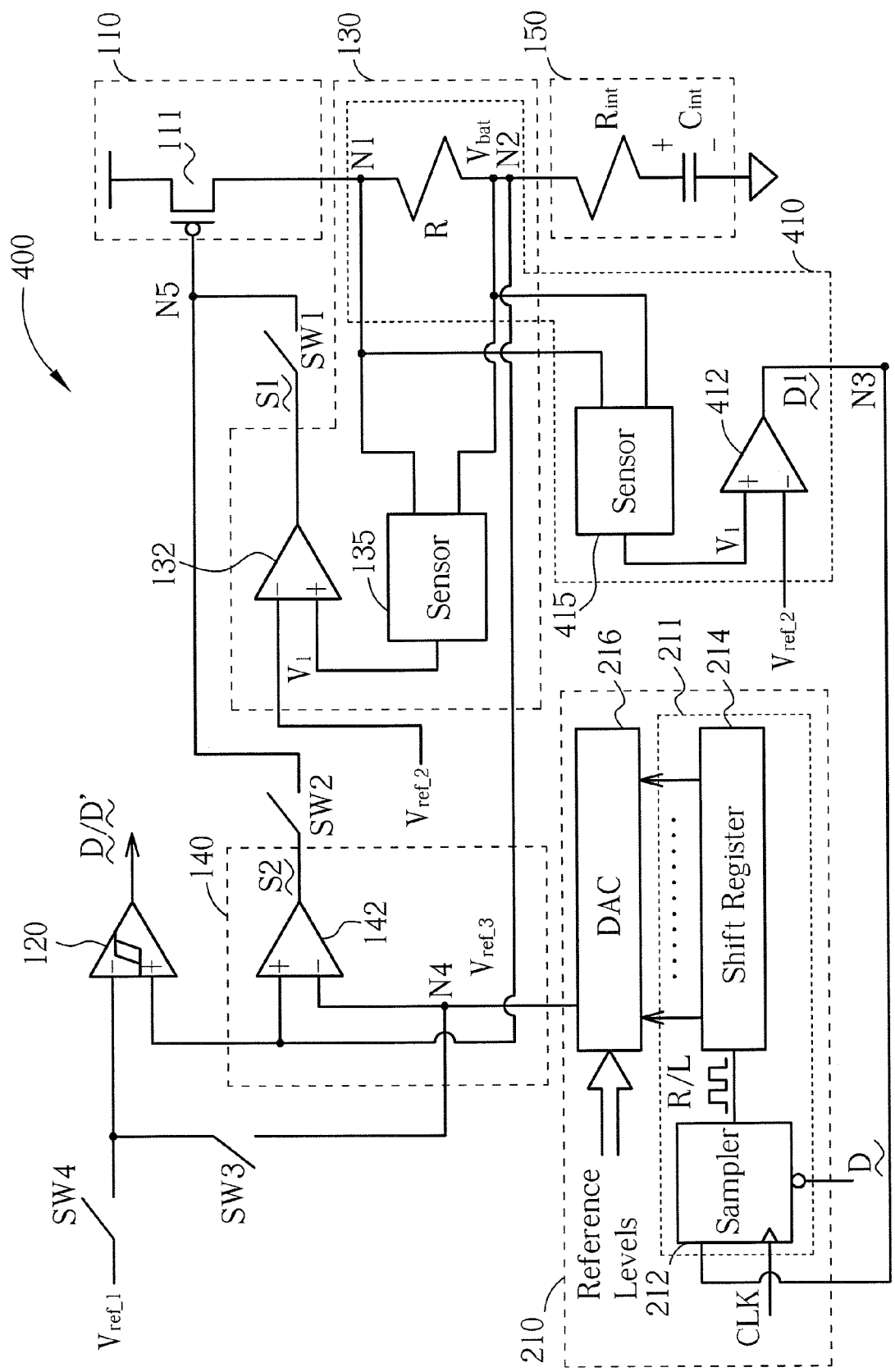
FIG. 4 is a diagram illustrating a battery charger according to another embodiment of the present invention.

According to another embodiment of the present invention, please refer to FIG. 4, the battery charger 400, compared with the battery charger 200, has an additional current sensing unit 410 for taking charge of the work that the CC mode controller 130 does in the CV mode. The current sensing unit 410 has a sensor 415 for sensing the current flowing through the resistor R and an operational amplifier 412 for comparing the voltage V1 with the reference signal $V_{ref\_2}$ to determine how to adjust the charging current. In this case, the operational amplifier 132 of the CC mode controller 130 is used purely for generating the regulation signal S1 in the CC mode, while the operational amplifier 412 of the current sensing unit 410 is used purely for generating the error signal D1 in the CV mode. Although there is a small difference between battery chargers 200 and 400 due to the additional current sensing unit 410, however, the functions of other elements and the operating principle of the battery charger 400 are the same as those mentioned in FIG. 2.

In summary, by gradually and adequately increasing or decreasing the reference voltage $V_{ref\_3}$, the unwanted overcurrent charging originally affecting the battery charger during the mode transition can be greatly reduced. As a result, for a large range of mismatch that may be between the comparator 120 and the operational amplifier 142, the overshoot of the charging current can be almost totally prevented by adding the adjusting mechanism to the related art battery charger 100.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A battery charger for charging a battery, comprising:
  a charging regulation circuit having an input terminal, a control terminal, and an output terminal, wherein the input terminal is for being coupled to a power supplier, the output terminal is coupled to a node N1, the control terminal is coupled to a node N5, and the charging regulation circuit outputs a charging current whose amount is regulated based on a regulation signal at the control terminal;
  a first current sensing unit having a first and a second input terminals and a first and a second output terminals, wherein the first input terminal is coupled to the node N1, the first output terminal is coupled to a node N2 for being coupled to the battery, the second input terminal is inputted by a first reference signal, the second output terminal is coupled to a node N3, and the first current sensing unit senses a current level on a path from the node N1 to the node N2 and outputs an error signal at the second output terminal based on the current level and the first reference signal;
  an operational amplifier having a positive input terminal coupled to the node N2, a negative input terminal coupled to a node N4, and an output terminal coupled to the node N5 for generating the regulation signal;
  a comparator for comparing a second reference signal with the voltage of the node N2, and generating an enabling signal;
  a first switch unit for electrically coupling the second output terminal of the first current sensing unit to the node N5 when the enabling signal is not active;
  a second switch unit for electrically coupling the output terminal of the operational amplifier to the node N5 when the enabling signal is active; and
  a third switch unit for electrically coupling the comparator to the second reference signal when the enabling signal is active, or for electrically coupling the comparator to the node N4 when the enabling signal is not active; and a reference voltage generator having an input terminal coupled to the node N3 and an output terminal coupled to the node N4, comprising:

an ADC for converting the error signal outputted by the first current sensing unit to a digital signal; and a DAC for converting the digital signal to a reference voltage, wherein the DAC decreases the reference voltage when the enabling signal is active and the error signal indicates that the current level on the path from the node N1 to the node N2 is greater than the first reference signal:

wherein the voltage at the node N2 reflects the battery voltage of the battery.

2. The battery charger of claim 1, wherein the battery is a Li-ion battery.

3. The battery charger of claim 1, wherein the ADC in the reference voltage generator comprises:

a sampler electrically coupled to the first current sensing unit, for generating a sampling result by sampling the error signal; and a shift register electrically coupled to the sampler for bit-shifting a register value stored in the shift register according to the sampling result.

4. The battery charger of claim 1, wherein the DAC in the reference voltage generator comprises:

a multiplexer (MUX) electrically coupled to the shift register and the operational amplifier for converting the register value to the reference voltage.

5. The battery charger of claim 1, wherein the comparator is a hysteresis comparator.

6. The battery charger of claim 1, wherein the first switch unit electrically couples the second output terminal of the first current sensing unit to the node N3 when the enabling signal is active.

* * * * *